(12) United States Patent
Iriarte

(10) Patent No.: US 11,290,032 B1
(45) Date of Patent: Mar. 29, 2022

(54) SYSTEMS AND METHODS FOR ELECTRIC VEHICLE ENERGY RECOVERY

(71) Applicant: Gonzalo Fuentes Iriarte, Madrid (ES)

(72) Inventor: Gonzalo Fuentes Iriarte, Madrid (ES)

( * ) Notice: Subject to any disclaimer, the term of this patent is extended or adjusted under 35 U.S.C. 154(b) by 0 days.

(21) Appl. No.: 17/388,897

(22) Filed: Jul. 29, 2021

Related U.S. Application Data

(63) Continuation of application No. 17/382,936, filed on Jul. 22, 2021.

(51) Int. Cl.
*B60G 13/14* (2006.01)
*H02N 2/18* (2006.01)
*H02J 7/00* (2006.01)
*B60R 16/033* (2006.01)

(52) U.S. Cl.
CPC ............. *H02N 2/186* (2013.01); *B60G 13/14* (2013.01); *H02J 7/0042* (2013.01); *B60R 16/033* (2013.01)

(58) Field of Classification Search
CPC ....... H02N 2/186; B60G 13/14; B60R 16/033
See application file for complete search history.

(56) References Cited

U.S. PATENT DOCUMENTS

| | | |
|---|---|---|
| 154,927 A | 9/1874 | Storle |
| 407,385 A | 7/1889 | Wilsey et al. |
| 656,323 A | 8/1900 | Hansel |
| 1,439,483 A | 12/1922 | Ritter |
| 1,557,570 A | 10/1925 | Eckman et al. |
| 2,286,897 A | 6/1942 | Costa et al. |
| 2,756,067 A | 7/1956 | Porsche et al. |
| 3,105,153 A | 9/1963 | James, Jr. |
| 3,292,945 A | 12/1966 | Dangauthier |
| 3,326,544 A | 6/1967 | Smith |
| 3,444,946 A | 5/1969 | Waterbury |
| 3,473,822 A | 10/1969 | Fitch |
| 3,499,163 A | 3/1970 | Verreault |
| 3,507,580 A | 4/1970 | Howard et al. |
| 3,517,766 A | 6/1970 | West |
| 3,530,356 A | 9/1970 | Aronson |
| 3,541,409 A | 11/1970 | Storsand |
| 3,556,239 A | 1/1971 | Spahn |
| 3,559,027 A | 1/1971 | Arsem |
| 3,621,930 A | 11/1971 | Dutchak |
| 3,688,859 A | 9/1972 | Hudspeth et al. |
| 3,713,503 A | 1/1973 | Haan |
| 3,747,950 A | 7/1973 | Hager |
| 3,753,092 A * | 8/1973 | Ludlow .............. G01R 27/2635 324/663 |
| 3,845,835 A | 11/1974 | Petit |

(Continued)

*Primary Examiner* — Frank B Vanaman
(74) *Attorney, Agent, or Firm* — Loeb & Loeb LLP

(57) ABSTRACT

A shock absorber including a shock absorber body substantially filled with a hydraulic fluid. The shock absorber includes a piston disposed within the shock absorber body that includes a piston head movable within the shock absorber to apply a pressure change in the hydraulic fluid. The shock absorber includes a piezoelectric material disposed within the shock absorber and in fluid communication with the hydraulic fluid. The piezoelectric material is configured to generate an electrical charge in response to the pressure change in the hydraulic fluid. The piezoelectric material is electrically connected to at least one battery configured to receive the electrical charge generated by the piezoelectric material.

11 Claims, 2 Drawing Sheets

(56) References Cited

U.S. PATENT DOCUMENTS

| | | | |
|---|---|---|---|
| 3,861,487 A | 1/1975 | Gill | |
| 3,874,472 A | 4/1975 | Deane | |
| 3,878,913 A | 4/1975 | Lionts et al. | |
| 3,880,250 A | 4/1975 | Emanuele | |
| 3,921,746 A | 11/1975 | Lewus | |
| 3,927,728 A | 12/1975 | Reime | |
| 3,939,935 A | 2/1976 | Gill | |
| 3,947,744 A | 3/1976 | Grace et al. | |
| 3,948,359 A * | 4/1976 | Rogers | F16F 9/3264 |
| | | | 188/1.11 R |
| 3,971,454 A | 7/1976 | Waterbury | |
| 3,980,152 A | 9/1976 | Manor | |
| 3,980,904 A * | 9/1976 | Onodera | H03H 9/02622 |
| | | | 310/313 B |
| 3,981,204 A | 9/1976 | Starbard | |
| 4,024,926 A | 5/1977 | Butoi | |
| 4,032,829 A | 6/1977 | Schenavar | |
| 4,073,562 A * | 2/1978 | Karlskind | H01R 13/523 |
| | | | 439/199 |
| 4,113,047 A | 9/1978 | Turner | |
| 4,141,425 A | 2/1979 | Treat | |
| 4,160,181 A | 7/1979 | Lichtenberg | |
| 4,181,188 A | 1/1980 | Dessert | |
| 4,218,624 A | 8/1980 | Schiavone | |
| 4,222,450 A | 9/1980 | Fobbs | |
| 4,277,737 A | 7/1981 | Muller-Werth | |
| 4,295,538 A | 10/1981 | Lewus | |
| 4,322,088 A | 3/1982 | Miyakoshi et al. | |
| 4,381,041 A | 4/1983 | Butoi | |
| 4,387,781 A | 6/1983 | Ezell | |
| 4,407,132 A | 10/1983 | Kawakatsu et al. | |
| 4,413,698 A | 11/1983 | Conrad et al. | |
| 4,440,413 A | 4/1984 | Miyakoshi et al. | |
| 4,566,717 A | 1/1986 | Arthur et al. | |
| 4,704,571 A | 11/1987 | Rosenberg | |
| 4,740,013 A | 4/1988 | Pierce, Jr. | |
| 4,753,078 A | 6/1988 | Gardner, Jr. | |
| 4,753,455 A | 6/1988 | Murakami et al. | |
| 4,805,409 A | 2/1989 | Kobayashi | |
| 4,830,396 A | 5/1989 | Gandiglio | |
| 4,871,187 A | 10/1989 | Schaible | |
| 4,881,752 A | 11/1989 | Tanaka | |
| 4,892,328 A | 1/1990 | Kurtzman et al. | |
| 4,900,054 A | 2/1990 | Kessler | |
| 4,961,483 A * | 10/1990 | Yamaoka | B60G 17/01941 |
| | | | 188/266.2 |
| 5,036,934 A | 8/1991 | Nishina | |
| 5,060,959 A | 10/1991 | Davis et al. | |
| 5,080,389 A | 1/1992 | Kawano et al. | |
| 5,091,679 A | 2/1992 | Murty et al. | |
| 5,108,126 A | 4/1992 | Banse | |
| 5,146,750 A | 9/1992 | Moscrip | |
| 5,193,845 A | 3/1993 | Yokote et al. | |
| 5,215,156 A | 6/1993 | Stulbach et al. | |
| 5,280,827 A | 1/1994 | Taylor et al. | |
| 5,296,785 A | 3/1994 | Miller | |
| 5,327,987 A | 7/1994 | Abdelmalek | |
| 5,337,560 A | 8/1994 | Abdelmalek | |
| 5,347,186 A | 9/1994 | Konotchick | |
| 5,364,114 A | 11/1994 | Petersen | |
| 5,390,949 A | 2/1995 | Naganathan et al. | |
| 5,400,596 A | 3/1995 | Shlien | |
| 5,411,285 A | 5/1995 | Lee | |
| 5,431,429 A | 7/1995 | Lee | |
| 5,570,286 A | 10/1996 | Margolis et al. | |
| 5,578,877 A | 11/1996 | Tiemann | |
| 5,590,734 A | 1/1997 | Caires | |
| 5,678,847 A | 10/1997 | Izawa et al. | |
| 5,704,632 A | 1/1998 | Lee | |
| 5,931,249 A | 8/1999 | Ellis et al. | |
| 5,986,429 A | 11/1999 | Mula, Jr. | |
| 5,996,745 A | 12/1999 | Jones, Jr. et al. | |
| 6,082,748 A | 7/2000 | Hartmann et al. | |
| 6,091,159 A | 7/2000 | Galich | |
| 6,111,375 A | 8/2000 | Zenobi | |
| 6,138,781 A | 10/2000 | Hakala | |
| 6,172,426 B1 | 1/2001 | Galich | |
| 6,193,029 B1 | 2/2001 | Crawley et al. | |
| 6,202,960 B1 | 3/2001 | Travis et al. | |
| 6,279,854 B1 | 8/2001 | Lindahl | |
| 6,362,534 B1 | 3/2002 | Kaufman | |
| 6,376,925 B1 | 4/2002 | Galich | |
| 6,394,238 B1 | 5/2002 | Rogala | |
| 6,427,812 B2 | 8/2002 | Crawley et al. | |
| 6,575,484 B2 | 6/2003 | Rogala et al. | |
| 6,734,645 B2 | 5/2004 | Auerbach | |
| 6,758,295 B2 | 7/2004 | Fleming | |
| 6,841,970 B2 | 1/2005 | Zabramny | |
| 6,920,951 B2 | 7/2005 | Song et al. | |
| 6,949,840 B2 | 9/2005 | Ricketts | |
| 6,952,060 B2 | 10/2005 | Goldner et al. | |
| 6,966,394 B2 | 11/2005 | Fleming | |
| 7,005,757 B2 | 2/2006 | Pandian | |
| 7,087,342 B2 | 8/2006 | Song et al. | |
| 7,135,786 B1 | 11/2006 | Deets | |
| 7,147,069 B2 | 12/2006 | Maberry | |
| 7,161,254 B1 | 1/2007 | Janky et al. | |
| 7,208,845 B2 * | 4/2007 | Masters | H02K 7/1892 |
| | | | 290/1 R |
| 7,239,031 B2 | 7/2007 | Ricketts | |
| 7,250,697 B2 | 7/2007 | Beaulieu | |
| 7,261,171 B2 | 8/2007 | de la Torre et al. | |
| 7,304,398 B1 | 12/2007 | Kim et al. | |
| 7,387,182 B2 | 6/2008 | Fleming | |
| 7,408,266 B2 | 8/2008 | Yeh | |
| 7,521,841 B2 | 4/2009 | Clingman et al. | |
| 7,566,979 B1 | 7/2009 | Hartman et al. | |
| 7,839,058 B1 | 11/2010 | Churchill et al. | |
| 7,936,113 B2 | 5/2011 | Namuduri et al. | |
| 7,938,217 B2 | 5/2011 | Stansbury, III | |
| 7,938,410 B2 | 5/2011 | Buma et al. | |
| 7,942,225 B2 | 5/2011 | Carabelli et al. | |
| 7,994,648 B1 | 8/2011 | Fielek | |
| 8,098,040 B1 | 1/2012 | Botto | |
| 8,143,766 B2 | 3/2012 | Namuduri et al. | |
| 8,253,281 B2 | 8/2012 | Namuduri et al. | |
| 8,261,865 B2 | 9/2012 | Stansburry, III | |
| 8,344,526 B2 | 1/2013 | Bhat et al. | |
| 8,376,100 B2 | 2/2013 | Avadhany et al. | |
| 8,392,030 B2 | 3/2013 | Anderson et al. | |
| 8,448,952 B2 | 5/2013 | Serbu et al. | |
| 8,476,778 B2 | 7/2013 | Weinberger et al. | |
| 8,479,859 B1 | 7/2013 | Okamoto | |
| 8,614,518 B2 | 12/2013 | Li et al. | |
| 8,624,409 B2 | 1/2014 | Sainio | |
| 8,820,064 B2 | 9/2014 | Six et al. | |
| 8,841,786 B2 | 9/2014 | Tucker et al. | |
| 8,966,889 B2 | 3/2015 | Six et al. | |
| 9,030,033 B2 | 5/2015 | Yoo et al. | |
| 9,057,361 B2 | 6/2015 | Donelan et al. | |
| 9,061,759 B2 | 6/2015 | Ditzler | |
| 9,076,961 B2 | 7/2015 | Baugher | |
| 9,222,468 B2 | 12/2015 | Mullins et al. | |
| 9,260,011 B2 | 2/2016 | Anderson et al. | |
| 9,270,153 B2 | 2/2016 | Yoo et al. | |
| 9,399,380 B1 | 7/2016 | Fan | |
| 9,453,550 B2 | 9/2016 | Smith | |
| 9,481,221 B2 | 11/2016 | Reybrouck | |
| 9,550,404 B2 | 1/2017 | Giovanardi et al. | |
| 9,570,910 B2 | 2/2017 | Chan et al. | |
| 9,597,939 B2 | 3/2017 | Anderson et al. | |
| 9,634,543 B2 | 4/2017 | May | |
| 9,665,069 B2 | 5/2017 | Hamatani et al. | |
| 9,670,975 B1 | 6/2017 | Rook | |
| 9,718,323 B2 | 8/2017 | Unger | |
| 9,732,818 B2 | 8/2017 | Himmelmann | |
| 9,784,288 B2 | 10/2017 | Six | |
| 9,840,122 B2 | 12/2017 | Niumeitolu | |
| 9,906,100 B2 | 2/2018 | Dolenti et al. | |
| 9,950,786 B2 | 4/2018 | Rook | |
| 9,960,714 B2 | 5/2018 | Kondoh et al. | |
| 9,989,076 B2 | 6/2018 | Samad | |
| 10,040,330 B2 | 8/2018 | Anderson et al. | |
| 10,052,926 B2 | 8/2018 | Conti et al. | |

(56) References Cited

U.S. PATENT DOCUMENTS

| | | | |
|---|---|---|---|
| 10,063,164 B2 | 8/2018 | Apdalhaliem et al. | |
| 10,072,724 B2 * | 9/2018 | Haugen | H02K 7/18 |
| 10,243,136 B2 | 3/2019 | Ghanbari et al. | |
| 10,370,092 B2 | 8/2019 | Bolukbasi et al. | |
| 10,377,371 B2 | 8/2019 | Anderson et al. | |
| 10,513,161 B2 | 12/2019 | Anderson et al. | |
| 10,583,707 B2 | 3/2020 | Kaskowicz | |
| 10,640,202 B2 | 5/2020 | Vatovec et al. | |
| 10,669,016 B2 | 6/2020 | Cusworth et al. | |
| 10,690,215 B2 | 6/2020 | Sakka et al. | |
| 10,723,193 B2 | 7/2020 | Kaskowicz | |
| 10,723,447 B2 | 7/2020 | Gandhi et al. | |
| 10,814,690 B1 | 10/2020 | Katzourakis et al. | |
| 2001/0008191 A1 | 7/2001 | Smith et al. | |
| 2002/0066608 A1 | 6/2002 | Guenard et al. | |
| 2002/0070510 A1 | 6/2002 | Rogala | |
| 2003/0015846 A1 | 1/2003 | Rogala et al. | |
| 2003/0030523 A1 | 2/2003 | Bell et al. | |
| 2003/0155464 A1 | 8/2003 | Tseng | |
| 2004/0113377 A1 | 6/2004 | Klees | |
| 2004/0119289 A1 | 6/2004 | Zabramny | |
| 2004/0206559 A1 | 10/2004 | Song et al. | |
| 2004/0206561 A1 | 10/2004 | Song et al. | |
| 2004/0226788 A1 * | 11/2004 | Tanner | F16F 15/022 188/267.1 |
| 2005/0098361 A1 | 5/2005 | Mitchell | |
| 2006/0016629 A1 | 1/2006 | Huard | |
| 2006/0125325 A1 | 6/2006 | Beaulieu | |
| 2006/0176158 A1 | 8/2006 | Fleming | |
| 2006/0219506 A1 | 10/2006 | Zdeb | |
| 2007/0074918 A1 | 4/2007 | Meyer | |
| 2007/0089924 A1 | 4/2007 | de la Torre et al. | |
| 2007/0089950 A1 | 4/2007 | Kim | |
| 2007/0205881 A1 | 9/2007 | Breed | |
| 2007/0251776 A1 | 11/2007 | Braun | |
| 2007/0273153 A1 | 11/2007 | de la Torre et al. | |
| 2008/0083222 A1 | 4/2008 | Hubert | |
| 2008/0252174 A1 | 10/2008 | Mohammadi et al. | |
| 2008/0277939 A1 | 11/2008 | Richardson et al. | |
| 2009/0045698 A1 | 2/2009 | Genis et al. | |
| 2009/0260935 A1 | 10/2009 | Avadhany et al. | |
| 2010/0006362 A1 | 1/2010 | Armstrong | |
| 2010/0045143 A1 | 2/2010 | Martin | |
| 2010/0052475 A1 | 3/2010 | Lee | |
| 2010/0084947 A1 | 4/2010 | Yoon et al. | |
| 2010/0219641 A1 | 9/2010 | Namuduri et al. | |
| 2010/0219720 A1 | 9/2010 | Namuduri et al. | |
| 2010/0219721 A1 | 9/2010 | Namuduri et al. | |
| 2010/0219798 A1 | 9/2010 | Namuduri et al. | |
| 2010/0244457 A1 | 9/2010 | Bhat et al. | |
| 2010/0262308 A1 | 10/2010 | Anderson et al. | |
| 2011/0084503 A1 | 4/2011 | Li et al. | |
| 2011/0115222 A1 | 5/2011 | Parker et al. | |
| 2011/0266801 A1 | 11/2011 | Sainio | |
| 2012/0146339 A1 | 6/2012 | Lee | |
| 2012/0193919 A1 | 8/2012 | Kuriki | |
| 2014/0182955 A1 | 7/2014 | Yoo et al. | |
| 2014/0183873 A1 | 7/2014 | Yoo et al. | |
| 2014/0353060 A1 | 12/2014 | Stansbury, III | |
| 2015/0192114 A1 | 7/2015 | Triebel et al. | |
| 2015/0316039 A1 | 11/2015 | Tucker et al. | |
| 2016/0121683 A1 | 5/2016 | Park | |

\* cited by examiner

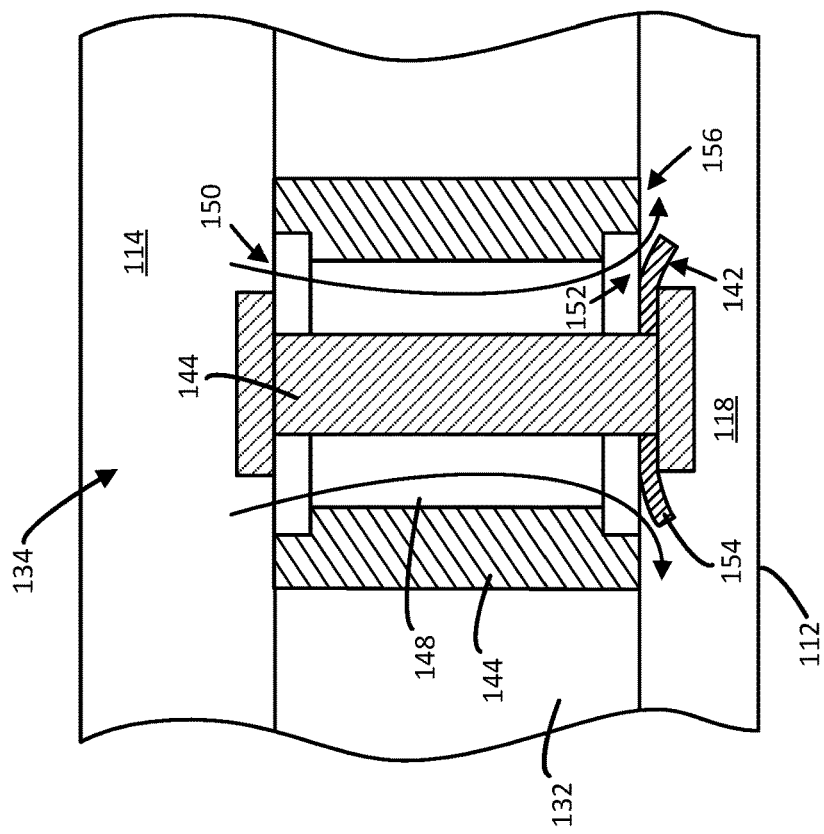
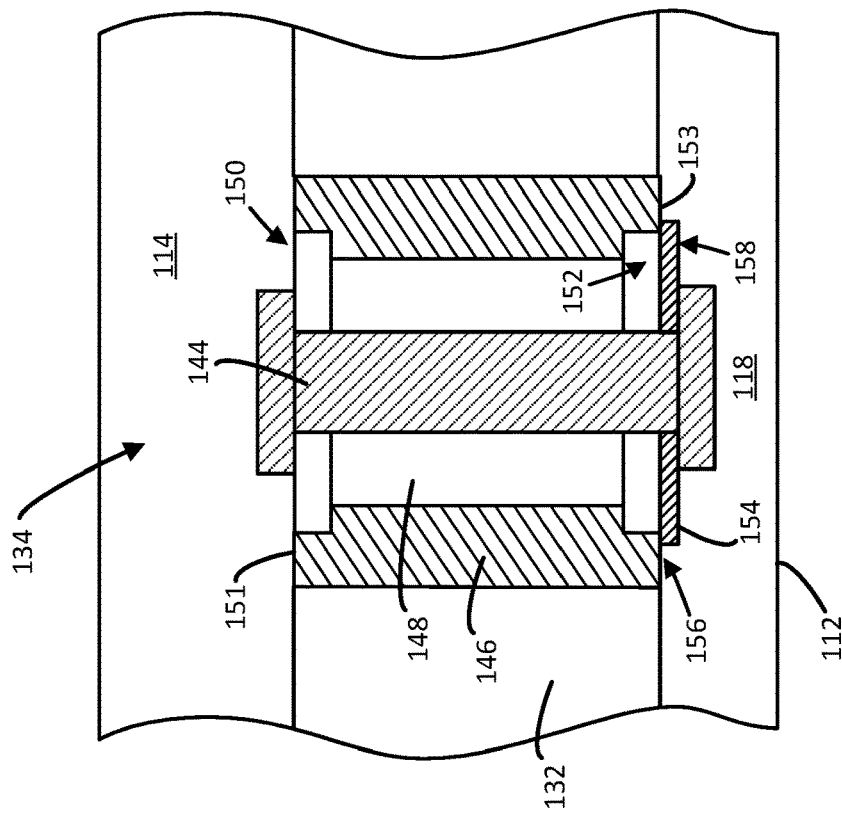

SYSTEMS AND METHODS FOR ELECTRIC VEHICLE ENERGY RECOVERY

PRIORITY CLAIM

This application is a continuation of U.S. patent application Ser. No. 17/382,936 filed Jul. 22, 2021, the entire contents of which are incorporated herein by reference.

FIELD

The disclosure relates to energy recovery and, more specifically, recovery of energy in vehicles.

BACKGROUND

The background description provided herein is for the purpose of generally presenting the context of the disclosure. The work of the presently named inventor, to the extent it is described in this background section, as well as aspects of the description that may not otherwise qualify as prior art at the time of filing, are neither expressly nor impliedly admitted as prior art against the present disclosure.

Traditionally, vehicles may use shock absorbers, struts, or combinations of both as part of a suspension system to provide a more stable and/or comfortable ride for passengers and cargo. The suspension system may also help maintain contact between the road and tires so the vehicle achieves better traction, which may improve steering, stopping, and overall vehicle stability and performance.

Traditional suspension systems may include springs that compress, storing energy, when the vehicle encounters bumps in the road. When the vehicle has passed the bump, the spring may decompress, releasing the stored energy. Left alone, the spring would rebound up and down until substantially all the energy is dissipated, resulting in unwanted vehicle bounce. To reduce bouncing and improve vehicle performance, many vehicles use shock absorbers to dampen spring rebound. Many shock absorbers may include oil-filled tubes in combination with a piston to convert the spring's energy into heat that may be dissipated into the air.

Systems are needed that may convert the energy absorbed and released by springs and other suspension components into usable energy.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a shock absorber including a shock absorber body that may be substantially filled with a hydraulic fluid and a piston that may be disposed within the shock absorber body. The piston may include a piston head that may be movable within the shock absorber so as to apply a pressure change in the hydraulic fluid. The shock absorber may include a piezoelectric material disposed within the shock absorber and in fluid communication with the hydraulic fluid. The piezoelectric material may be configured to generate an electrical charge in response to the pressure change in the hydraulic fluid. The piezoelectric material may be electrically connected to at least one battery configured to receive the electrical charge generated by the piezoelectric material.

In another embodiment, the disclosure describes an energy recovery system for a vehicle. The energy recovery system may include at least one battery disposed in the vehicle and one or more shock absorbers disposed in the vehicle. The one or more shock absorbers may include hydraulic fluid configured to undergo pressure changes. The energy recovery system may include a piezoelectric material disposed within the one or more shock absorbers, where the piezoelectric material may be configured to generate an electrical charge in response to the pressure changes in the hydraulic fluid. The energy recovery system may include an electrical connection between the at least one battery and the piezoelectric material, where the electrical connection may be configured to carry the electrical charge generated by the piezoelectric material to the at least one battery.

In another embodiment, the disclosure describes a vehicle that may include a vehicle body, at least one battery disposed on the vehicle body, and one or more wheel assemblies each including a wheel configured to contact a driving surface. The vehicle may include one or more shock absorbers each including a first end connected to the vehicle body and a second end connected to one of the one or more wheel assemblies and configured to absorb variations in the driving surface. Each of the one or more shock absorbers may include a main chamber substantially filled with a hydraulic fluid configured to undergo pressure changes in response to the variations in the driving surface and a piezoelectric material disposed within main chamber. The piezoelectric material may be configured to generate an electrical charge in response to the pressure changes in the hydraulic fluid. The vehicle may include an electrical connection between the at least one battery and the piezoelectric material, where the electrical connection may be configured to carry the electrical charge generated by the piezoelectric material to the at least one battery.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 2A is a schematic drawing of an embodiment of a valve that may be included in the shock absorber of FIG. 1A; and FIG. 2B is a schematic drawing of the valve of FIG. 2A during a compression movement.

Figure 1A:
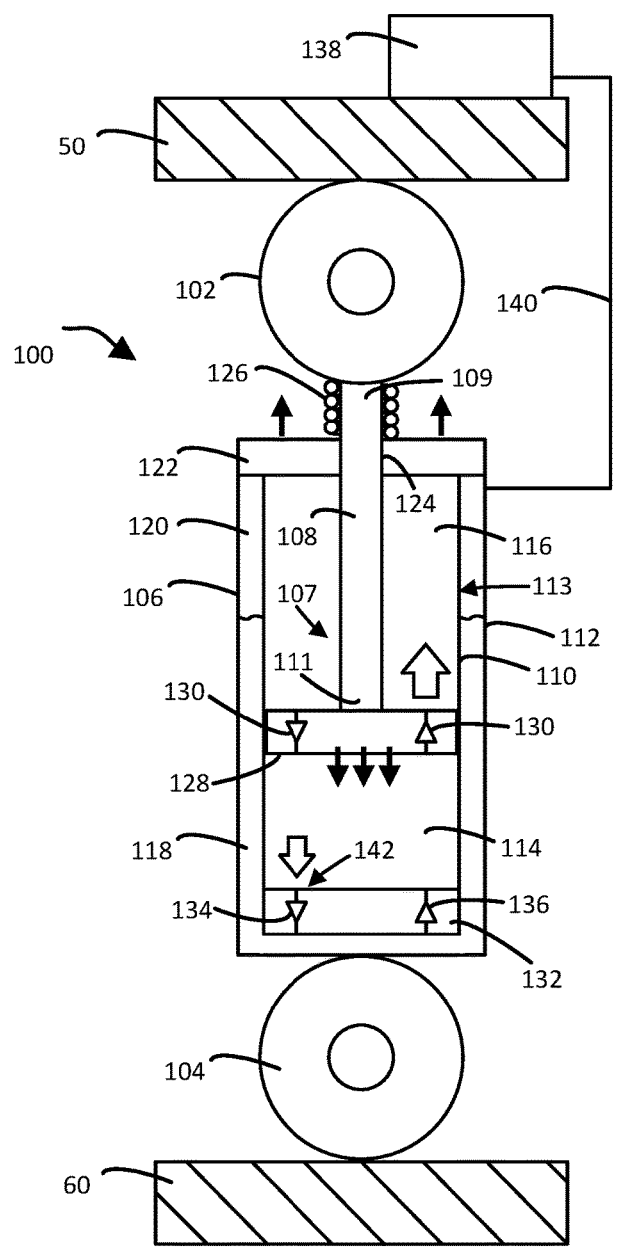
FIG. 1A is a schematic drawing of an embodiment of a shock absorber during a compression movement as shown and described herein.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

In some embodiments, the disclosure describes systems and methods for converting or transforming kinetic energy in a vehicle's shock absorbers into electrical energy that may be stored or otherwise used. In some embodiments, the disclosure describes using piezoelectric materials and/or films within shock absorbers to generate electrical flow in reaction to pressure changes in oil housed within the shock absorbers. The generated electrical flow may then be delivered to a battery for storage or to other vehicle components to provide power. In general, the disclosure describes transforming shock absorber movements due to bumps in the road, turns, or other vehicle movement into electricity that may be used by the vehicle.

In some embodiments, the energy recovery system may be applied in conventional shock absorbers, or maybe be used in shock absorbers designed specially to maximize the advantages of the disclosure. For example, it is contemplated that shock absorbers could be designed that may maximize pressure changes within the shock absorber's oil-filled tubes in order to maximize electrical flow from piezoelectric materials exposed to those pressures.

Figure 1B:
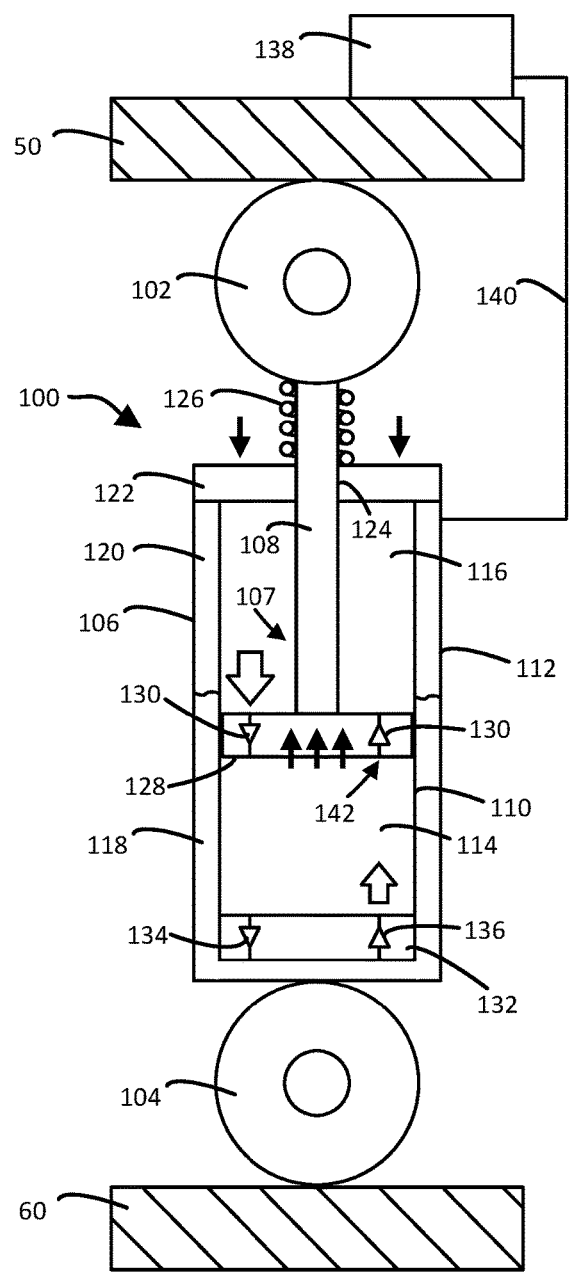
FIG. 1B is a schematic drawing of the shock absorber of FIG. 1A during a rebound movement.

FIGS. 1A and 1B show an embodiment of a shock absorber 100 including an embodiment of an energy recovery system. The shock absorber 100 may include a first end 102 and a second end 104. In some embodiments, the first end 102 may be an upper mount that may be connected to a vehicle body 50 and the second end 104 may be a lower mount and may be connected to a wheel assembly 60, which may include a lower control, control arm, struts, etc., as well as a wheel that may make contact with the road or other driving surface. In some embodiments, the vehicle body 50 may be the chassis of a vehicle that may include one or more rechargeable batteries. Accordingly, the shock absorber 100 may be positioned between the vehicle body 50 and the wheel assembly 60 in order to cushion and absorb bumps. It is contemplated that, in some embodiments, the first end 102 may be connected to the wheel assembly 60 and the second end 104 may be connected to the vehicle body 50 without significant alterations to the disclosure. In some embodiments, the shock absorber 100 may include a shock absorber body 106 that may be connected to the second end 104 and a piston 107 that may be connected to the first end 102.

In some embodiments, the shock absorber body 106 may include a double-tube type assembly, which may include a first tube 110 housed within a second tube 112. It is contemplated, however, that the shock absorber body may be a different type in other embodiments, such as a single-tube type assembly. The first tube 110 may be substantially cylindrical and include a main chamber 113 that may be divided into a lower chamber 114 and an upper chamber 116 by a piston head 128, where both the lower chamber and upper chamber may be substantially filled with a hydraulic fluid, such as oil. In some embodiments, the shock absorber oil may be at least somewhat electrically conductive. In some embodiments, the second tube 112 may substantially surround the first tube 110 and include a reserve chamber 118, which may be defined as a space between the second tube and the first tube. The reserve chamber 118 may be partially filled with hydraulic fluid, such as oil, and partially filled with a compressible or compressed gas, such as nitrogen gas 120. The nitrogen gas 120 in the reserve chamber 118 may be more or less compressed depending on the level of oil or other hydraulic fluid in the reserve chamber 118.

In some embodiments, the shock absorber body 106 may include a top portion 122 closing off the first tube 110. The top portion 122 of the shock absorber body 106 may form a piston orifice 124 through which the piston 107 may be slidably disposed. In some embodiments, the piston orifice 124 may include a gasket, bearings, or other sealing mechanism to prevent fluid from leaking out of the upper chamber 116 through the piston orifice. In some embodiments, a spring 126 may be disposed on the shock absorber 100 so as to absorb bumps and other road imperfections encountered by the tires and wheel assembly 60. As the wheel assembly 60 moves upward, the second end 104 of the shock absorber 100 may push the shock absorber body 106 toward the first end 102 and the vehicle body 50. The piston 107 may move with respect to the top portion 122 of the shock absorber body 106, compressing the spring 126. When compressed, the spring 126 may absorb and store energy. Once the tire has passed the bump, the spring 126 may uncompress, releasing the stored energy and pushing the shock absorber body 106 back away from the vehicle body 50. Those skilled in the art will recognize that, while the spring 126 is shown between a shock absorber body and a vehicle body, in other embodiments, one or more springs may be disposed in various positions to absorb upward movement of the wheel assembly without straying from the scope of this disclosure.

In some embodiments, the oil within the shock absorber body 106 may act to dampen oscillations resulting from the spring 126 compressing and uncompressing. In some embodiments, the piston 107 may include a piston rod 108 having a first end 109 and a second end 111 opposite the first end. The first end 109 of the piston rod 108 may be connected to the first end 102 of the shock absorber 100 and a piston head 128 may be disposed at the second end 111 of the piston rod opposite the first end 102 of the shock absorber 100. The piston head 128 may be substantially cylindrically shaped and may be disposed within the first tube 110 so as to substantially occlude the entire cross section of the first tube. The piston head 128 may be slidably positioned within the first tube 110 and may define a movable boundary between the lower chamber 114 and the upper chamber 116 that may resize the lower chamber and upper chamber as it moved with respect to the shock absorber body 106. In some embodiments, the piston head 128 may include piston bearings substantially entirely surrounding the circumference of the piston head that may reduce wear and friction between the piston head and inner walls of the first tube 110. Because the piston may, through valving, limit the flow of the hydraulic fluid between the upper and lower chambers 116, 114 when the shock absorber 100 may be compressed or extended, the shock absorber may produce a damping force that may counteract the vibration that may otherwise be transmitted from an unsprung portion to a sprung portion of the vehicle. (i.e., the vehicle body 50 to the wheel assembly 60).

In some embodiments, the piston head 128 may include one or more piston valves 130 that may selectively allow oil to move between the lower chamber 114 and the upper chamber 116 as the piston head 128 moves within the first tube 110. For example, FIG. 1A illustrates the shock absorber body 106 moving toward the first end 102 of the shock absorber, as the piston rod 108 slides in the piston orifice 124 with respect to the top portion 122 of the shock absorber body. As the shock absorber body 106 moves up, the piston head 128 may move down relative to the shock absorber body, applying pressure to the oil within the lower chamber 114. Under the pressure of the moving piston rod 108 and piston head 128, a portion of the oil in the lower chamber 114 may be forced into the upper chamber 116 through the one or more piston valves 130. In some embodiments, the piston valves 130 may be sized and configured so as to allow a flow rate from the lower chamber 114 to the upper chamber 116 sufficient to dampen road shocks. In some embodiments, the piston valves 130 may be variable so as to allow more or less fluid flow between chambers depending on the pressure applied to the valve by the oil. In some embodiments, it is contemplated that at least one of the one or more piston valves 130 may be one way valves providing for flow only from the lower chamber 114 to the upper chamber 116, and at least one of the one or more piston valves may be one way valves providing for flow only from the upper chamber to the lower chamber. In some embodiments, the one or more piston valves may be two way valves. In some embodiments, dampening rate provided by the one or more piston valves 130 may be responsive to the speed of the piston rod 108 and/or piston head 128. For example, as the piston 107 moves faster (e.g., as a result of a larger bump and/or higher vehicle speeds), the shock absorber may become more rigid due to increased resistance to movement. In some embodiments, the one or more piston valves 130 may be calibrated valves that may allow compression and rebound forces to be adjusted by controlling the oil flow through the piston valves in differing driving conditions. FIG. 1B illustrates an embodiment of the spring 126 rebounding and pulling the piston rod 108 and the piston head 128 toward the top portion 122 of the shock absorber body 106, decreasing the pressure within the lower chamber 114 (and increasing the pressure in the upper chamber 116) and causing the oil to flow from the upper chamber to the lower chamber in the reverse or the manner described above regarding compression of the shock absorber 100.

In some embodiments, the shock absorber body 106 may also include a base portion 132 that may include one or more base valves 134, 136. The base valves 134, 136 may operate in a similar manner to the piston valves 130, except that the base valves may provide for oil within the lower chamber 114 to move between the lower chamber and the reserve chamber 118. In some embodiments, at least one of the base valves 134, 136 may be a compression valve 134, and at least one of the base valves 134, 136 may be a rebound valve 136. The compression valve 134 may provide for a portion of the oil within the lower chamber 114 to flow into the reserve chamber 118 when the shock absorber 100 compresses, causing piston head 128 to apply pressure to the oil in the lower chamber in response to upward movement of the shock absorber body 106 with respect to the piston 107 and the vehicle body 50. In some embodiments, when the shock absorber 100 compresses due to uneven ground or other road conditions, the piston head 128 may increase the pressure within the lower chamber 114. Of course, those of skill in the art will recognize that, in some embodiments, the piston 107 may instead be connected to the wheel assembly 60 and move vertically in response to road bumps, turns, etc. When oil flows into the reserve chamber 118 from the lower chamber 114, the gas 120 (e.g., nitrogen gas) in the reserve chamber may be compressed as the oil level in the reserve chamber rises. In some embodiments, the compression valves 134 may control the resistance of the damper or compression movement while oil may flow substantially uninhibited from the lower chamber 114 to the upper chamber 116 through the one or more piston valves 130. In some embodiments, increased pressure in the lower chamber 114 may cause the compression valves 134 to progressively open and allow excess oil to flow into the reserve chamber 118 in a substantially controlled manner. In some embodiments, during a rebound movement when the spring 126 releases its stored energy to move the shock absorber body 106 back away from the vehicle body 50 (such as shown in FIG. 1B), the piston rod 108 and/or the piston head 128 may move toward the top portion 122 of the shock absorber body 106. The piston 107 movement may create a vacuum and/or decrease the pressure within the lower chamber 114, which may pull oil from the reserve chamber 118 into the lower chamber 114 through the at least one rebound valve 136. In some embodiments, the shock absorber 100 may include multiple compression valves 134, rebound valves 136, and piston valves 130 that may be configured for opening at variable speeds and to accommodate varying speeds and sized of compression based on varying road conditions.

In some embodiments, for the shock absorber 100 to perform its function effectively, the lower chamber 114 may substantially always be full of oil. In some embodiments, the volume of oil returning to the lower chamber 114 from the reserve chamber 118 during a rebound movement may be substantially equivalent to the volume of oil that moved from the lower chamber to the reserve chamber during compression, which may keep the lower chamber substantially full of oil. In some embodiments, the reserve chamber 118 may substantially always be partially full of oil so as to ensure that the lower chamber 114 fills with oil regardless of how compressed the shock absorber 100 becomes. In some embodiments, oil from the reserve chamber 118 may also be used to help fill the lower chamber 114 to compensate for the increased overall volume of the first tube 110 as the piston head 128 and/or piston rod 108 retracts from the tube because the volume of oil in the upper chamber 116 alone may not be enough to fill the lower chamber.

In some embodiments, the vehicle in which the shock absorber 100 may be installed may include one or more batteries 138. The battery 138 may be a single battery traditionally used to provide a spark to start an internal combustion engine and/or power accessories (e.g., radio, lights, etc.) of the vehicle. In some embodiments, the one or more batteries 138 may additionally or exclusively be used to power an electric motor that may be part of a hybrid gas/electric drive system or fully electric drive system in the vehicle. In any event, a charging wire 140 or other conductive conduit may electrically connect the one or more batteries 138 to the shock absorber 100. In some embodiments, the charging wire 140 may be connected to the shock absorber body 106. In such embodiments, the shock absorber body 106 may be made at least partially from an electrically conductive material, and the hydraulic oil within the first tube 110 may be electrically conductive. In some embodiments, as described in more detail with respect to FIG. 2, electrical charges generated from inside the first tube 110 may travel through the hydraulic fluid within the first tube 110, be conducted through the shock absorber body 106, and be conducted from the shock absorber body to the wire 140 and into the one or more batteries 138. In some embodiments, the charging wire 140 may pass directly into the lower chamber 114 or upper chamber 116 and receive the electrical charge directly through the hydraulic oil. In some embodiments, the charging wire 140 may be electrically connected directly to the source of the generated electrical charge itself. In some embodiments, the electrical charge conducted from the within the shock absorber body 106 may charge and/or recharge the one or more batteries, providing for extended battery life, increase mileage, saving of fuel, etc.

In some embodiments, an electrical charge may be produced within the first tube 110 based on the changing oil pressures resulting from bumps on the road compressing and the spring 126 decompressing the shock absorber 100. In some embodiments, a piezoelectric material 142 may be disposed within the first tube 110, such as within the lower chamber 114, and exposed to the changing pressures resulting from the piston head 128 moving within the first tube 110 as described above. Upon experiencing increasing pressure and associated mechanical stress, the piezoelectric material may generate a voltage across the material, which may induce a current in the hydraulic oil, the charging wire 140, and/or the shock absorber body 106. In some embodiments, the piezoelectric material may be one of a variety of appropriate materials known in the art that exhibit piezoelectric properties including, but not limited to, piezoelectric ceramics such as lead zirconate titanate (PZT), barium titanate, and lead titanate, piezoelectric thin films such as aluminum nitride (AlN) or aluminum scandium nitride (ScAlN), and/or piezoelectric crystals such as quartz, lithium niobate (LiNbO3), lithium tantalate (LiTaO3), and tourmaline. In some embodiments, the piezoelectric material may be applied in a thin layer to other components of the shock absorber 100, such as valves, pistons, etc., that may be exposed to pressure differentials during operation. In some embodiments, the application of the piezoelectric material may be applied in piezoelectric nanolayers to one or more components of the shock absorber 100, such as elastic disks in valve assemblies, etc. In some embodiments, piezoelectric nanolayers may be applied to components of the shock absorber 100, for example, using conventional methods used in nanotechnology, such as MBE (Molecular Beam Epitaxi), reactive sputtering, ALD (Atomic Layer Deposition), CVD (Chemical Vapor Deposition), etc. In some embodiments, at least one Interdigital Transducer (IDT) may be applied to the piezoelectric material. In some embodiments, the IDT may be a device including an array of electrodes that may be disposed on a surface of a piezoelectric substrate and may convert electrical signals into surface acoustic waves (SAW) and vice versa. In some embodiments, an energy transfer from the piezoelectric material 142 to the environment and/or to the at least one battery 138 may occur via the at least one IDT disposed on one or more components of the shock absorber 100, such as elastic disks or rings in valve assemblies, etc.

FIGS. 2A and 2B shows a close-up, simplified diagram of an illustrative embodiment of a compression valve 134, one or more of which may be mounted in the shock absorber 100, such as in the base portion 132 as a base valve or in the piston head 128 as a piston valve 130. In the illustrated embodiment, the compression valve 134 is mounted in the base portion 132, but those of skill in the art will understand that any suitable number of compression valves may be mounted in the base portion and/or the piston head 128 or other suitable locations of the shock absorber 100. Additionally, those skilled in the art will recognize that other suitable embodiments of base valves, piston valves, or other valves may be used consistent with the scope of the disclosure. In some embodiments, the compression valve 134 may provide selective fluid communication between the lower chamber 114 of the first tube 110 and the reserve chamber 118 through the base portion 132.

In some embodiments, compression valve or similar valve may provide selective fluid communication between the lower chamber 114 and the upper chamber 116 through the piston head. FIG. 2A shows an embodiment of the compression valve 134 in a closed position preventing fluid transfer between the lower chamber 114 and the reserve chamber 118. In some embodiments, the compression valve 134 may be in the closed position when the piston rod 108 and the piston head 128 may be in a rebound movement, such as is illustrated in FIG. 1B. In such a rebound movement, a rebound valve 136 may allow fluid communication between the reserve chamber 118 and the lower chamber 114 where hydraulic fluid may flow back into the lower chamber 114 from the reserve chamber 118. FIG. 2B shows the compression valve 134 in an open position, which may allow for fluid communication from the lower chamber 114 into the reserve chamber 118. In some embodiments, the compression valve 134 may be in the open position when the piston rod 108 and the piston head 128 may be in a compression movement, such as illustrated in FIG. 1A. In such a compression movement, the compression valve 134 may allow fluid communication between the lower chamber 114 and the reserve chamber 118 where hydraulic fluid may flow from the lower chamber 114 into the reserve chamber 118.

In some embodiments, the valve 134 may include a valve core 144 disposed substantially through the base portion 132, a valve wall 146, disposed through the base portion, and a valve channel 148 formed between the valve core and the valve channel. In some embodiments, the valve 134 may include an inlet end 151 exposed to the lower chamber 114 and an outlet end 153 exposed to the reserve chamber. In some embodiments, the valve core 144 may be substantially cylindrical in shape and the valve wall 146 may be substantially tubular in shape and may substantially surround the valve core. In some embodiments, the valve channel 148 may selective provide fluid communication between the lower chamber 114 and the reserve chamber 118 between a valve inlet 150 on the inlet end 151 of the valve 134 and a valve outlet 152 on the outlet end 153. The valve 134 may also include at least one valve disk or ring 154 that may be flexible and disposed so as to selective occlude the valve outlet 152 when in contact with a valve seat 156 on the outlet end 153 of the valve 134. In some embodiments, the valve ring 154 may be designed so as to prevent flow from the lower chamber 114 to the reserve chamber 118 when the pressure within the lower chamber may be below a maximum lower chamber pressure. When the pressure within the lower chamber 114 exceeds the maximum lower chamber pressure, the valve ring 154 may deform in response to the fluid pressure, at least partially separating from the valve seat 156 as shown in FIG. 2B. Fluid from the lower chamber 114 may then flow into the reserve chamber 118. In some embodiments, more than one valve ring may be used and configured so as to variably allow fluid to flow based on the particular shock absorber design and purpose.

In some embodiments, the valve ring 154 may be made from a piezoelectric material that, as described above, may generate an electrical charge when mechanically deformed or when under pressure. In some embodiments, the valve ring 154 may be coated in a thin layer of piezoelectric material 142. Accordingly, when enough pressure builds up within the lower chamber 114, the valve ring 154 may deform in reaction to this pressure as shown in FIG. 2B, and that deforming movement of the piezoelectric material may release an electrical charge. In some embodiments, the electrical charge generated by the piezoelectric material of the valve rings 154 may be directed back to a vehicle battery 138, such as shown in FIGS. 1A and 1B. In some embodiments, the hydraulic fluid within the shock absorber 100 may be at least somewhat electrically conductive and configured to carry the charge generated by the deformed valve ring 154 through the hydraulic fluid within the chamber into the charging wire 140 or other conductive material, an on to the battery 138 for charging. Because, in some embodiments, each shock absorber may include multiple valves that may each include one or more valve rings made from or coated in a piezoelectric material, electrical charges may flow from each such valve or other piezoelectric material exposed to pressure changes within the shock absorber 100 back to the battery for storage. It is contemplated that, in some embodiments, charging wires may be connected directly to the piezoelectric materials in the shock absorber 100 so as to carry generated charges directly to the battery 138.

While the figures and description herein mainly describe generating electrical charges using piezoelectric materials to make or coat flexible valve components, it is contemplated that other structures or features included in the upper chamber 116, lower chamber 114, or reserve chamber 118 may be exposed to pressure differentials as a result of shock absorber motion and as a product of changes in hydraulic pressure. In these ways, a vehicle's shock absorbers 100 may aide in recovering energy stored in springs and other shock absorber components while absorbing road bumps and other vehicle movements.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A shock absorber comprising:
    a shock absorber body substantially filled with a hydraulic fluid, wherein the shock absorber body includes a main chamber and a reserve chamber;
    a piston disposed within the shock absorber body, the piston including a piston head that is movable within the main chamber so as to apply a pressure change in the hydraulic fluid;
    at least one valve disposed in the shock absorber body so as to provide selective fluid communication between the main chamber and the reserve chamber, the at least one valve including a valve ring configured to deform in response to the pressure change in the hydraulic fluid; and
    a piezoelectric material included in the valve ring of the at least one valve, wherein the piezoelectric material is in fluid communication with the hydraulic fluid, and wherein the piezoelectric material is configured to generate an electrical charge in response to the pressure change in the hydraulic fluid,
    wherein the piezoelectric material is electrically connected to at least one battery configured to receive the electrical charge generated by the piezoelectric material.

2. The shock absorber of claim 1, wherein the piezoelectric material is applied to the valve ring in nanolayers using at least one of Molecular Beam Epitaxi, reactive sputtering, Atomic Layer Deposition, or Chemical Vapor Deposition.

3. The shock absorber of claim 1, wherein the hydraulic fluid is electrically conductive, and wherein the electrical charge generated by the piezoelectric material flows to the at least one battery via at least one of the hydraulic fluid or an electrically conductive wire.

4. The shock absorber of claim 1 further comprising at least one valve in the piston head configured to provide fluid communication between a lower chamber and an upper chamber of the main chamber, the at least one valve in the piston head including a piezoelectric material.

5. An energy recovery system for a vehicle, the energy recovery system including:
    at least one battery disposed in the vehicle;
    one or more shock absorbers disposed in the vehicle, the one or more shock absorbers including:
        a main chamber and a reserve chamber,
        hydraulic fluid configured to undergo pressure changes,
        a piston head movably disposed in the main chamber to apply the pressure changes to the hydraulic fluid, and
        at least one valve providing selective fluid communication between the main chamber and the reserve chamber, the at least one valve including a valve ring including a piezoelectric material, wherein the valve ring is configured to deform in response to the pressure changes in the hydraulic fluid, and wherein the piezoelectric material is configured to generate an electrical charge in response to the pressure changes in the hydraulic fluid; and
    an electrical connection between the at least one battery and the piezoelectric material, the electrical connection configured to carry the electrical charge generated by the piezoelectric material to the at least one battery.

6. The energy recovery system of claim 5, wherein the piezoelectric material is applied to the valve ring in nanolayers.

7. The energy recovery system of claim 5, wherein the hydraulic fluid is electrically conductive and wherein the electrical charge generated by the piezoelectric material flows to the at least one battery via at least one of the hydraulic fluid or an electrically conductive wire.

8. The energy recovery system of claim 5 further comprising at least one valve in the piston head configured to provide fluid communication between a lower chamber and an upper chamber of the main chamber, the at least one valve in the piston head including a piezoelectric material.

9. A vehicle comprising:
a vehicle body;
at least one battery disposed on the vehicle body;
one or more wheel assemblies each including a wheel configured to contact a driving surface;
one or more shock absorbers each including a first end connected to the vehicle body and a second end connected to one of the one or more wheel assemblies and configured to absorb variations in the driving surface, each of the one or more shock absorbers including:
a main chamber substantially filled with a hydraulic fluid configured to undergo pressure changes in response to the variations in the driving surface,
a reserve chamber,
a piston head movably disposed in the main chamber to apply the pressure changes to the hydraulic fluid,
at least one valve providing selective fluid communication between the main chamber and the reserve chamber, the at least one valve including at least one valve ring configured to deform in response to the pressure changes in the hydraulic fluid, and
a piezoelectric material included in the valve ring of the at least one valve, the piezoelectric material configured to generate an electrical charge in response to the pressure changes in the hydraulic fluid; and
an electrical connection between the at least one battery and the piezoelectric material, the electrical connection configured to carry the electrical charge generated by the piezoelectric material to the at least one battery.

10. The vehicle of claim 5, wherein the piezoelectric material is applied to the valve ring in nanolayers using at least one of Molecular Beam Epitaxi, reactive sputtering, Atomic Layer Deposition, or Chemical Vapor Deposition.

11. The vehicle of claim 9 further comprising at least one interdigital transducer applied to the piezoelectric material.

* * * * *